July 5, 1966 — R. K. SCHELKE — 3,259,680
METHOD OF MOLDING SLEEVES
Original Filed Nov 20, 1957
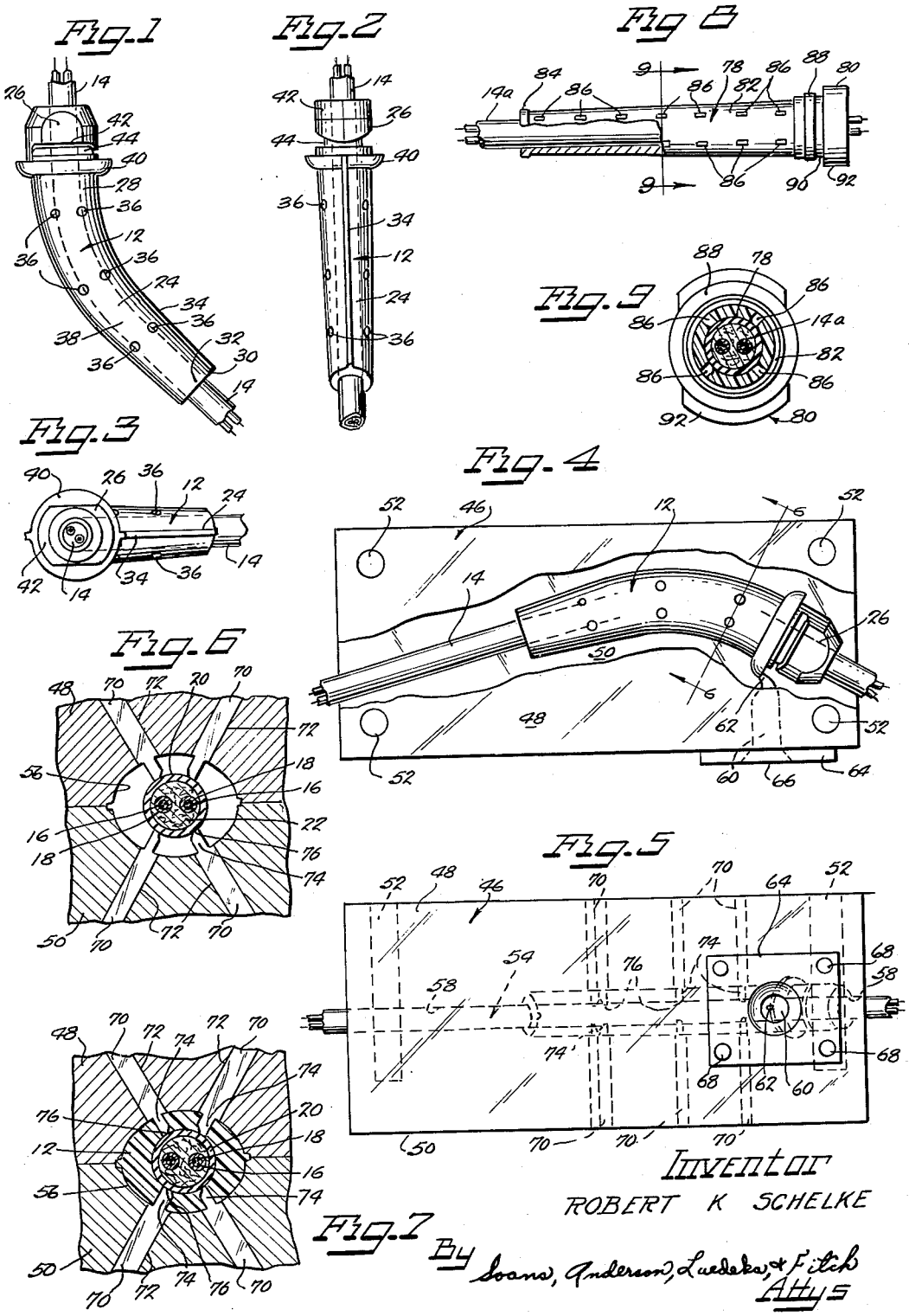
Inventor
ROBERT K SCHELKE United States Patent Office 3,259,680
Patented July 5, 1966

3,259,680
METHOD OF MOLDING SLEEVES
Robert K. Schelke, Richmond, Ind., assignor to Belden Manufacturing Company, Chicago, Ill., a corporation of Illinois
Continuation of application Ser. No. 78,076, Dec. 23, 1960, which is a division of application Ser. No. 697,584, Nov. 20, 1957, now Patent No. 3,051,774.
This application Sept. 16, 1963, Ser. No. 309,918
2 Claims. (Cl. 264—275)

This application is a continuation of an earlier filed application, Serial No. 78,076, filed December 23, 1960, and now abandoned. The earlier filed application is a division of an earlier filed application, Ser. No. 697,584, filed Nov. 20, 1957, now Patent No. 3,051,774.

The present invention relates to injection molding of sleeves and more particularly to a method of molding a sleeve on an electrical conductor.

Certain types of sleeves, such as those which form part of strain reliefs and which are connected to the ends of plugs, have been found to be relatively difficult to mold directly around flexible electrical conductor cords. When such molding is attempted, the conductor cord has a tendency to be displaced transversely and/or axially during the process. Consequently, in the finished product the conductor cord frequently is not properly centered within the sleeve throughout its entire length so that the side wall of the sleeve is of uneven thickness. In some extreme cases, a considerable area of the conductor cord is exposed through the side wall of the sleeve. The uneven thickness of the side wall of the sleeve results in a product of inferior appearance and performance.

In order to minimize the chances of the conductor cord protruding from the side wall of the sleeve, certain sleeves are purposely made relatively thick walled. Such thick walled sleeves are more expensive to fabricate than thin walled sleeves.

In some instances, sleeves are fabricated separately and thereafter assembled around the conductor cord. An example of this is the conventional cone-shaped wire type of strain relief which has been used with conductor cords for some appliances. This procedure, of course, is somewhat expensive. Moreover, a tight fit between the strain relief and the conductor cord, which increases the efficiency of the strain relief, may be difficult to obtain by such means.

It is an object of the present invention to provide a method of injection molding a sleeve on a flexible electrical cord. An additional object of the present invention is to provide a method of injection molding a sleeve of pleasing appearance and controlled wall thickness directly around a flexible electrical conductor in a manner so that the conductor is accurately aligned centrally within the sleeve. Other objects and advantages of the present invention will be apparent from a study of the following detailed description and of the accompanying drawings in which:

FIGURE 1 is a side elevation showing a sleeve of a strain relief formed in accordance with the present invention;

FIGURE 2 is a view of the strain relief of FIGURE 1 taken from the right hand side of FIGURE 1;

FIGURE 3 is an end view of the strain relief of FIGURE 1;

FIGURE 4 is a plan view of a mold partially broken away to show the relative positioning of the strain relief of FIGURE 1 therein;

FIGURE 5 is a side elevation of the mold shown in FIGURE 4;

FIGURE 6 is an enlarged fragmentary cross section taken along the section line 6—6 of FIGURE 4 showing an electrical conductor cord positioned within the mold before the strain relief is formed therearound;

FIGURE 7 is a view similar to FIGURE 6 but shows the strain relief formed about the conductor cord;

FIGURE 8 is a side elevation of another embodiment of a sleeve of a strain relief formed in accordance with the present invention, and FIGURE 9 is an enlarged cross section taken along the line 9—9 of FIGURE 8.

The present invention comprises a method of injection molding a sleeve around a flexible electrical conductor cord. More particularly, the method includes disposing a flexible and insulated electrical conductor cord within a recess in a lower mold section and holding the cord centrally within the recess by contacting the periphery of the cord with a plurality of pins or blades which are disposed at a plurality of points within the recess and which are secured to the recess wall. A complementing top mold section is then disposed over the bottom mold section and a suitable plastic is injected into the cavity around the conductor cord while the conductor cord is maintained in its desired position by the pins. Thereafter, the upper mold section is removed and the formed sleeve and conductor cord are withdrawn from the lower recess as a unit. The formed sleeve so produced has a controlled wall thickness and shape and is provided with a plurality of decorative apertures which extend into the side wall thereof.

Referring more particularly to the accompanying drawings, FIGURE 1 shows a strain relief the sleeve of which is formed in accordance with the present invention. In FIGURE 1, the strain relief 12 is shown disposed in tightly abutting relation around the periphery of an insulated flexible electrical conductor cord 14.

The conductor cord 14, illustrated, is generally circular in cross section and comprises, as shown more particularly in FIGURES 6 and 7, a pair of electrically conductive wires 16, each of which is enclosed in an insulating sheath 18. The insulated wires 16 are encased in an insulating jacket 20 of a flexible material, such as rubber, vinyl, etc. The space between the insulated wires 16 and the jacket 20 may be filled with an insulating and cushioning medium 22, such as fiber or the like.

The strain relief 12 (FIGURE 1) comprises a relatively thin sleeve 24 which is formed about the cord and a head 26 integrally connected to one end of the sleeve. The head is adapted to be connected to an appliance or other equipment to which the cord is to be attached. One type of head which is adapted to be connected into an electrical appliance frame or the like is generally set forth in United States Patent No. 2,494,814, to Huth, issued January 17, 1950. The sleeve may also be connected with an electrical connector, which is connected to the end of a conductor cord, such as that shown in United States Patent No. 2,788,502, to Schelke et al., April 9, 1957. In certain applications the sleeve need not be connected to a head such as, for example, where the sleeve is to be applied to some intermediate portion of a conductor cord rather than adjacent the end of the conductor cord.

The sleeve shown in FIGURES 1, 3 and 4, is molded of resilient flexible material, such as vinyl, and is generally oval in cross section. The sleeve 24 tapers inwardly from the end 28, adjacent the head 26 to an end wall 30, and is slightly curved. The end 28 of sleeve 24 which is opposite the end wall 30 and which is integrally connected to the head 26 is of substantially greater diameter and wall thickness than the opposite end 32 adjacent the end wall 30. The cord 14 is shown in dotted outline in FIGURE 1 and in this figure the relative wall thickness of the sleeve 24 and of the head 26 can be readily observed. This construction produces a relatively greater flexibility at the end 32 than at the end 28 of the sleeve 24.

The outer surface which defines the sleeve 24 is provided with a pair of opposed beaded portions 34 running along the length of the inner and outer curvatures of sleeve 24, as shown in FIGURE 1, primarily for decorative purposes.

The outer surface of the sleeve 24 is also provided with a plurality of apertures 36. These apertures extend through the side wall 38 of the sleeve 24 radially of the cord 14 (FIGURE 7) and communicate with cord 14. In the embodiment of FIGURES 1 to 7, inclusive, the apertures are uniformly spaced and generally circular in cross section. However, the apertures need not be uniformly spaced and furthermore, may be of any other suitable shape and shapes, such as rectangular, square, wedge shaped or the like.

The apertures 36 correspond to the location of a plurality of holding means, such as pins or blades, more fully described hereinafter, for holding the conductor cord 14 centrally within a cavity in a mold, at the time sleeve 24 is formed therearound. The apertures 36 are decorative and, furthermore, expose portions of the jacket 20 of conductor cord 14 to view. Accordingly, if the jacket 20 is in a contrasting color to that of strain relief 12, the appearance of the combination of the conductor cord and the strain relief is further improved. The apertures 36 have the further advantage of imparting improved flexibility to the sleeve 24. In this connection, the apertures act as foci for stretching and compressing of the sleeve 24 during flexing thereof and tend to decrease cracking of the side wall 38 of the sleeve.

The head 26 is disposed around the cord 14 and is integrally connected with the end 28 of sleeve 24. The head 26 may be formed of the same resilient, flexible, durable material as is utilized for the sleeve 24.

The illustrated head 26 comprises an enlarged circular abutment portion 40 and a generally oval connecting portion 42 integrally connected thereto. The connecting portion 42 is tapered at its outer end, and is somewhat flattened along two opposite sides, as shown in FIGURES 1 and 2. The connecting portion 42 has a space 44 in the form of an interrupted annular groove around about three quarters of its circumference for receiving the frame of an appliance.

The attachment of the strain relief 12 to the frame (not shown) of an electrical appliance or the like can, for example, be carried out by first passing the oval portion 42 into the appliance through a corresponding aperture in the frame thereof until the space 44 is aligned with the frame. The thickness of the frame should be at least the width of space 44. The strain relief 12 can then be rotated 90 degrees to strongly engage the opposing walls of space 44 with the opposite sides of the frame adjacent the frame aperture and achieve the desired clamping action. The strain relief 12 is thereby locked in an operative position in the appliance. In such position, the abutment portion 40 of the strain relief 12 shields those portions of the frame aperture not covered by the connecting portion 42 of the head 26.

The strain relief 12 may be injection molded from any easily shaped, resilient, flexible, durable material, preferably having electrical insulating properties, such as synthetic rubber, plastic or the like. The material may be identical or different from that utilized for the outer sheath 20 of the conductor cord 14. The material utilized to fabricate the strain relief 12 should be capable of being readily shaped at a temperature below that which would deleteriously affect the conductor cord 14, since the strain relief is directly molded around the conductor cord. Moreover, the material for the strain relief 12 may be colored with suitable pigments to enhance the pleasing appearance of the strain relief.

The disclosed embodiments of the strain reliefs may be injection molded in accordance with the method of the present invention by utilizing apparatus as illustrated in FIGURES 4 to 7, inclusive, of the accompanying drawings. In this connection, a mold 46 is provided which comprises a top section 48 and a complementary bottom section 50. The sections 48 and 50 are provided with complementary recesses so that when the sections are properly joined together, as by a plurality of aligning pins 52, shown in FIGURE 4, these recesses define a cavity 54, the intermediate portion 56 of which has the size and shape of the outer surface of the strain relief 12, and the end portions 58 of which have the size and shape of the conductor cord 14. The mold 46 is also provided with a molding compound inlet 60 formed by co-operating grooves in sections 48 and 50. The inlet 60 narrows at its inner end within the mold, as shown in FIGURE 4, to a small neck portion 62 which communicates with the cavity 54. A plate 64 may be provided, if desired, which plate has an aperture 66 therein aligned with and of the same size as the outer end of inlet 60. The plate 64 may be secured to the sections 48 and 50, as by pins 68 running through suitable apertures in the plate 64 and the sections 48 and 50, so as to aid in maintaining sections 48 and 50 in rigid alignment during use of mold 46.

The sections 48 and 50 are also provided with conductor cord aligning and holding means which, as shown particularly in FIGURES 6 and 7, comprises a plurality of pins 70 seated in suitable channels 72 in the mold 46. The pins 70 preferably extend at small angles from the vertical, about 20 to 45 degrees, preferably about 30° into the intermediate portion 56 of the cavity 54. It has been found that angling the pins 70 into the mold 46 allows the formed strain relief 12 and the conductor cord 14 to be more easily disengaged from the mold after fabrication. The portion 74 of each pin 70 which extends into the cavity 54 is reduced in diameter and the end 76 thereof which contacts the periphery of the conductor cord 14 may have a curved surface corresponding to the curve of the jacket 20 of the conductor cord. The pins 70 are aligned within the mold 46 so that when the conductor cord 14 is disposed within the cavity 54 with its periphery in contact with the pins 70, the cord 14 is held in a desired position and is prevented from being displaced during molding of the sleeve 24 therearound.

It should be understood that the holding means may comprise, instead of the pins 70, any other suitable plurality of spaced means which extend into the cavity containing the conductor cord and which hold the conductor cord in place while the sleeve is molded therearound. In this connection, the holding means may be, for example, a plurality of spikes, barbs, wedges or the teeth of a comb-like or blade-like implement which extend to and contact jacket 20 at a plurality of points. In any case, the holding means should be arranged so that the side wall of the strain relief will be essentially continuous when formed around such holding means.

In accordance with the method of the present invention the conductor cord 14 is first disposed within the cavity 54 in the mold 46. In this regard, the cord 14 is placed within the recess in the lower section 50 of the mold 46 after the pins 70 have been inserted in that portion of the mold. The top section 48 of the mold 46 with its pins 70 in place, as shown in FIGURE 6, is placed on the lower section of the mold and the two sections are secured together, as by means of the aligning pins 52, the plate 64 and the associated pins 68. When the sections 48 and 50 of the mold 46 are thus secured together, the cord 14 is held in predetermined alignment within the mold 46, since the pins 70 contact the periphery of cord 14 at a plurality of points within the intermediate portion 56 of the cavity 54, and center the cord 14 within that portion of the cavity. The end portions 58 of the cavity 54 are just large enough and of a suitable shape to snugly hold the parts of the cord 14 disposed within these portions. A cross sectional view of the mold 46 in the assembled position with the conductor cord 14 properly centered within the cavity before the strain relief 12 is molded therearound is shown in FIGURE 6.

The number, size and shape of the holding means may be varied in accordance with the requirements for the particular sleeve molding process. In this regard, if the conductor cord is relatively thin and very flexible a greater number of the pins 70 may be desired than the number utilized in fabricating the illustrated strain relief 12, in order to prevent the conductor cord from becoming transversely displaced during the subsequent sleeve molding step. The number and size of the holding means utilized may also somewhat depend upon the degree of flexibility it is desired to impart to the sleeve 24 of strain relief 12. In this regard, the greater the number or diameter of the holding means, the greater the number or diameter of the apertures in the sleeve 24 and, accordingly, the greater the flexibility thereof.

To prevent axial displacement of the conductor cord as well as transverse displacement during the injection molding step, the pins 70 are disposed within portion 56 of cavity 54 so as to define a cylinder slightly smaller in diameter than that of the cord 14. Thus, when the cord is placed within the cavity 54 and the sections of the mold 46 are secured together, the pins 70 press into and slightly indent the jacket 20 of the cord 14 without piercing the same.

In accordance with the method of the present invention, after the conductor cord 14 is centered within the cavity 54 the strain relief 12 is formed around the conductor cord 14 while the cord is maintained in the desired position in the portion 56 of the cavity 54 by the pins 70. The step of molding the strain relief can be carried out under any well-known conventional molding conditions utilizing the previously described readily shaped resilient material. The particular conditions utilized depend upon the particular material selected for use in injection molding the strain relief. For example, the strain relief 12 can be injection molded around the conductor cord 14, utilizing a polyethylene plastic molding compound, the compound being introduced into the intermediate portion 56 of the cavity 54 under high pressure in fluid or plastic form through the inlet 60 until the intermediate portion is filled, as shown in FIGURES 4 and 7, thereby forming the strain relief 12. After the cavity 54 is filled, the molding material sets to a resilient, flexible solid. Thereafter, the upper section 48 of the mold 46 is separated from the lower section 50 after removing the plate 64. The unit comprising the conductor cord 14 with the strain relief 12 disposed therearound is stripped from the lower section of the mold.

If a sleeve is formed of the same material as that constituting the jacket 20 of the conductor cord 14 or of another material compatible therewith and of substantially the same melting or softening point, the inner surfaces of the sleeve may be bonded to the outer surface of the jacket 20 during processing. In some instances, this may be a preferred construction.

Various commercial embodiments of strain reliefs have been successfully fabricated around various types of conductors in accordance with the method of the present invention. A preferred strain relief is one of the general shape and proportions set forth in FIGURES 1 to 7, inclusive. This strain relief is constructed of rubber and is disposed around a centrally located, ¼ inch diameter and longitudinally extending two wire conductor cord. The strain relief has an overall length of about 2¾ inches, with a short straight head about ⅝ inch long and generally oval in cross section, and a curved and tapered sleeve, also generally oval in cross section.

The sleeve in cross section is about ⅝ inch wide along its major axis and about 7/16 inch wide along its minor axis at the end integrally connected to the head, while uniformly tapering to a width of 7/16 inch along its major axis and ⅜ inch along its minor axis at its opposite end. Maximum wall thickness of the head at the end of the sleeve adjacent the head is about 3/16 inch while that at the opposite small tapered end of the sleeve is about 3/32 inch. Accordingly, the flexibility of the strain relief sleeve increases in the direction of the smaller tapered end.

The sleeve is curved substantially uniformly along its major axis so that its small tapered end is at an angle of about 30 degrees from the longitudinal axis of the strain relief. Twelve apertures of about 3/32 inch diameter are symmetrically disposed in the sleeve wall and communicate with the surface of the conductor cord. The conductor cord has a black outer sheath while the strain relief is white so that a decorative contrast is afforded, which is enhanced by exposure of the conductor cord to view through the described apertures.

Another embodiment of a sleeve of a strain relief formed in accordance with the present invention is set forth in FIGURES 8 and 9 of the accompanying drawings. As shown, the sleeve of the strain relief 78 is straight and essentially circular in cross section. The strain relief 78 is fabricated from resilient flexible material, as previously described for the strain relief 12. The strain relief 78 comprises a head 80 and a sleeve 82 integrally connected at one end thereof to the head. The strain relief is tightly disposed in abutting relation around a conductor cord 14a centered within and longitudinally extending through the strain relief.

The sleeve 82 is tapered downwardly throughout substantially its entire length, that is, from the point of connection with the head 80 to its opposite end which is of smaller diameter and which terminates in a raised annular rim 84. The side wall of the sleeve 82 is provided with a plurality of uniformly spaced apertures 86, generally rectangular in cross section, which communicate with the conductor cord 14a disposed within the sleeve.

The head 80 includes an expanded abutment portion 88 adjacent the sleeve 82 and a connection portion 90, the latter terminating in an expanded portion 92 for connection of the strain relief 78, with an electrical apparatus.

The strain relief 78 is fabricated in accordance with the method of the present invention, for example, with apparatus similar in construction to that previously described for the strain relief 12. However, the plurality of holding means for the conductor cord necessarily are of generally rectangular cross section, at least for those portions thereof extending into the sleeve molding cavity.

From the foregoing, it will be apparent that a sleeve of improved characteristics and adaptability can be readily fabricated in an inexpensive and efficient manner directly around an electrical conductor in accordance with the method of the present invention. Such modifications in the steps of the method of molding sleeves, as will be apparent to those skilled in the art, are contemplated as being within the scope of the present invention.

Various features of the invention are set forth in the accompanying claims.

What is claimed is:
1. The method of injection molding an integral flexible sleeve directly around a portion of a flexible insulated electrical conductor cord, which method comprises the steps of disposing a portion of said cord within a suitably shaped mold, maintaining said flexible cord in a centrally located position within the mold through the utilization of a plurality of axially spaced rigid pins which are disposed within the mold cavity in a plane extending transverse to the axis of said cord and which extend into the mold cavity a distance so as to engage the insulated covering of said cord to maintain said cord in said central position without piercing said covering, said pins being axially spaced throughout substantially the entire length of the mold to support said cord in said central position, injecting a molding compound into the mold cavity surrounding said conductor cord while said pins are in engagement with said covering of said cord so as to prevent axial and transverse movement of said cord within the mold cavity, allowing said molding compound to set in said mold to form an integral sleeve about said cord while maintaining said pins in engagement with the insulating covering of said cord, and thereafter removing said pins thereby forming apertures in said sleeve, whereby a conductor cord is provided having an integral sleeve disposed thereabout which includes a plurality of apertures extending therethrough which impart desired flexibility to the sleeve.

2. The method of fabricating an integral flexible sleeve around a portion of an elongated flexible electrical conductor cord by injection molding, which method comprises the steps of disposing a portion of an elongated flexible electrical conductor cord within a mold having walls which define an elongated mold cavity, holding said cord in centered alignment within the mold cavity by contacting the periphery of said conductor cord along the length thereof with a plurality of sets of pins, each of said sets of pins including at least three spaced pins extending inward of the mold cavity and disposed in a plane extending transverse of the axis of said cord, the inner ends of said pins in each of said sets forming an area which is smaller in cross section than said cord so that each of said sets of pins engages said cord to maintain said cord centrally of the mold cavity, injecting a resilient molding compound into said cavity while maintaining said cord in central alignment by means of said pins so as to prevent axial and transverse movement of said cord within said cavity, cooling said mold to solidify said molding compound to form an integral sleeve about said cord while maintaining said pins in engagement with said cord, and thereafter removing said pins thereby forming apertures in said sleeve, whereby a conductor cord is provided having an integral sleeve disposed thereabout which includes a plurality of apertures extending therethrough which impart desired flexibility to the sleeve.

References Cited by the Examiner
UNITED STATES PATENTS

| | | | |
|---|---|---|---|
| 1,562,912 | 11/1925 | Penfold | 264—275 |
| 1,692,340 | 11/1928 | Lattin | 18—42 |
| 2,361,348 | 10/1944 | Dickson et al. | 264—278 |
| 2,973,501 | 2/1961 | Mapelsden et al. | 264—271 |
| 3,090,999 | 5/1963 | Karns | 264—275 |

ROBERT F. WHITE, *Primary Examiner.*

F. MARLOWE, L. S. SQUIRES, *Examiners.*